United States Patent
Kannan et al.

(10) Patent No.: US 12,450,003 B2
(45) Date of Patent: Oct. 21, 2025

(54) MACHINE LEARNING FACETS FOR DATASET PREPARATION IN STORAGE DEVICES

(71) Applicant: Hewlett Packard Enterprise Development LP, Houston, TX (US)

(72) Inventors: Kalapriya Kannan, Karnataka (IN); Chaitra Kallianpur, Andover, MA (US); Bruce Rabe, Andover, MA (US); Suparna Bhattacharya, Karnataka (IN); Krishnaraju Thangaraju, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/821,513

(22) Filed: Aug. 23, 2022

(65) Prior Publication Data
US 2024/0069787 A1 Feb. 29, 2024

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .... G06F 3/0655; G06F 3/0604; G06F 3/0679; G06F 3/06; G06F 16/215; G06F 3/0661; G06F 3/067; G06F 3/0671; G06F 3/0611; G06F 3/0613; G06F 3/0646; G06F 3/0683; G06N 20/00
See application file for complete search history.

(56) References Cited

U.S. PATENT DOCUMENTS

| | | | |
|---|---|---|---|
| 8,762,583 B1 | 6/2014 | Faibish et al. | |
| 11,030,054 B2 | 6/2021 | Dain et al. | |
| 11,735,309 B2 * | 8/2023 | Purdie | G16H 50/20 705/2 |
| 2020/0242078 A1 | 7/2020 | Dain et al. | |
| 2021/0117563 A1 | 4/2021 | Moresmau et al. | |
| 2023/0236586 A1 * | 7/2023 | Cheon | G05B 13/0265 700/110 |

(Continued)

OTHER PUBLICATIONS

Martinez-Plumed, F., et al., "The Facets of Artificial Intelligence: A Framework to Track the Evolution of AI", Proceedings of the Twenty-Seventh International Joint Conference on Artificial Intelligence (IJCAI-18), pp. 5180-5187.

(Continued)

*Primary Examiner* — Maher N Algibhah
(74) *Attorney, Agent, or Firm* — Hewlett Packard Enterprise Patent Department (57) ABSTRACT

Examples described herein relate to preparing datasets in a storage device for machine learning (ML) applications. Examples include maintaining ML facet mappings between ML facets and dataset preparation tags, deriving ML facets of a dataset stored in the storage device, and generating filtered datasets from the datasets using the ML facets and ML facet mappings. The filtered dataset is associated with improved dataset quality compared to unfiltered dataset. The storage device transmits the filtered dataset to ML applications requesting the dataset. Some examples include recommending, by the storage device, ML facets to the ML application based on performance metrics.

19 Claims, 5 Drawing Sheets

(56) References Cited

U.S. PATENT DOCUMENTS

2023/0401457 A1* 12/2023 Sodhi ............... G06N 20/00

OTHER PUBLICATIONS

"Feature Store for Machine Learning,", available online at <https://www.featurestore.org/>, 2024, 12 pages.
"Intelligent Storage Solution for the AI-Enabled Enterprises", available online at <https://www.infortrend.com/Event2019/201903-gsi/201903-gsi-eDM.html>, 2019, 5 pages.
Dell Technologies, "DataIQ Auto-tag Solutions", Mar. 2020, 27 pages.
Dell Technologies, "Tags in DataIQ", available online at <https://infohub.delltechnologies.com/en-us/l/powerscale-onefs-a-metadata-driven-approach-to-on-demand-tiering/tags-in-dataiq/>, 2025, 2 pages.
DVC, "Data Version Control—and much more—for AI projects", available online at <https://dvc.org/>, 2025, 4 pages.
Gartner, "What Generative AI Means for Business", available online at <https://www.gartner.com/en/insights>, 2021, 11 pages.
H2O.ai, "AI Cloud Platform", available online at <https://www.h2o.ai>, 2024, 14 pages.
Hazelwood et al., "Applied Machine Learning at Facebook: A Datacenter Infrastructure Perspective", 2018, 10 pages.
IBM, "IBM Fusion", available online at <https://www.ibm.com/products/storage-fusion>, 2025, 14 pages.
IBM, "Storage for Data and AI", available online at <https://www.ibm.com/ai-storage>, 2025, 15 Pages.
Kunal Agarwal, "Big Data is Making Major Headway in Cloud", available online at <https://www.apmdigest.com/big-data-is-making-major-headway-in-cloud>, Mar. 25, 2019, 11 pages.
LFAI Trustworthy AI, "Principles for Trusted AI", available online at <https://lfaidata.foundation/projects/trusted-ai/>, 2024, 3 pages.
Pure Storage, Inc, "Drive IT transformation, reduce risk, and enhance business outcomes", available online at <https://www.purestorage.com/>, 2025, 8 pages.
Tecton, "Tecton Feature Store,", available online at <https://www.tecton.ai/product/predictive-ml/feature-store/>, 2023, 5 pages.
"Best Data Management Platforms, Vendors, Companies, Software, Tools _ Solutions Review—Best Data Management Software, Vendors and Data Science Platforms", available online at <https://web.archive.org/web/20210302191746/https://solutionsreview.com/data-management/>, Mar. 2, 2021, 6 pages.
AWS, "AWS Glue Simple, flexible, and cost-effective ETL", available online at <https://web.archive.org/web/20200331131818/https://aws.amazon.com/glue/>, Mar. 31, 2020, 8 pages.
AWS, "AWS Glue DataBrew", available online at <https://web.archive.org/web/20210302025833/https://aws.amazon.com/glue/features/databrew/>, Mar. 2, 2021, 8 pages.
AWS, "Building Big Data Storage Solutions (Data Lakes) for Maximum Flexibility", Jul. 2017, 29 pages.
Dell Technologies, "PowerScale—Scale-out NAS Storage _ Dell USA", available online at <https://web.archive.org/web/20231027134846/https://www.dell.com/en-us/shop/powerscale-family/sf/powerscale>, Oct. 27, 2023, 1 page.
Editor's Choice, "Mining the metadata and more: Tips for good AI data storage practices", available online at <https://www.information-age.com/mining-metadata-good-ai-data-storage-practices-15111/>, Jan. 2, 2020, 8 pages.
Flywheel, "Imaging Research Data Management Platform", available online at <https://web.archive.org/web/20220819115655/https://flywheel.io/flywheel-is-research-data-management/>, Aug. 19, 2022, 13 pages.
Gary Ogasawara, "Got Metadata? Your AI Models Depend on It, but Your Storage Systems Probably Aren't Collecting Enough", available online at <https://aithority.com/guest-authors/got-metadata-your-ai-models-depend-on-it-but-your-storage-systems-probably-arent-collecting-enough/>, Nov. 5, 2019, 5 pages.
HPE, "Enterprise Data Storage Systems_ DAS, NAS, SAN & Cloud Storage", available online at <https://web.archive.org/web/20210308084504/https://www.hpe.com/us/en/storage.html>, Mar. 8, 2021, 9 pages.
IBM, "Designing and Building End-to-End Data Pipelines Using IBM Spectrum Storage for AI with NVIDIA DGX Systems", IBM Storage & SDI Solutions , 2019, 30 pages.
IBM, "IBM Products", available online at <https://web.archive.org/web/20210701075351/https://www.ibm.com/products>, Jul. 1, 2021, 6 pages.
IBM, "IBM Storage for data and AI Solution Brief", 2020, 9 pages.
OCI, "What Is a Data Catalog and Why Do You Need One?", available online at <https://www.oracle.com/big-data/data-catalog/what-is-a-data-catalog/>, Jan. 9, 2021, 6 pages.
Sriharsha M S, "Detecting and redacting PII using Amazon Comprehend", AWS, available online at <https://aws.amazon.com/blogs/machine-learning/detecting-and-redacting-pii-using-amazon-comprehend/>, Sep. 17, 2020, 13 pages.
Tensorflow, "ML Metadata", available online at <https://web.archive.org/web/20210814062455/https://www.tensorflow.org/resources/models-datasets>, Aug. 14, 2021, 11 pages.

* cited by examiner

MACHINE LEARNING FACETS FOR DATASET PREPARATION IN STORAGE DEVICES

BACKGROUND

Machine learning (ML) applications, executing on a server, for example, send read requests to a storage device to retrieve data for training algorithms and models to generate insights. The data may include data samples and associated features, some of which may not be useful to the particular ML application. ML models are developed with the objective of generating accurate insights in a timely manner, and when their respective ML applications consume large datasets including information that is not useful, retrieving such datasets from the storage device becomes a huge bottleneck restricting the performance of the ML models.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain labels may be omitted from certain figures for the sake of clarity.

DETAILED DESCRIPTION

A large amount of training data is required when an ML application trains its ML model to a desirable level of accuracy. Moving this training data from storage to the ML model becomes a bottleneck that can reduce the performance of the ML model by requiring a large amount of training time, reducing the frequency of retraining, reducing the amount of data used for training, or otherwise compromising the ML model based on the practicalities of transferring large amounts of data from relatively slow storage.

Often, the ML model does not need all of the data that is transferred when a dataset is requested from storage, resulting in performance degradation with no gain in the quality of the ML model. For example, the dataset may include raw data, which may contain noisy, redundant, and/or superfluous information. Raw data may include data samples or associated features that are repetitive (e.g., multiple instances of the same rows or columns in a dataset table), missing values (e.g., empty cells), excess or inessential data.

As can be appreciated, this data does not improve ML model performance. Therefore, storage devices often provide datasets that are not only of poor quality but also are unnecessarily large. Some storage devices utilize their computational resources to prepare datasets by removing or filtering the raw data. However, existing systems with such storage devices are often unable to reliably remove or filter the unnecessary portions of the datasets.

In examples consistent with this disclosure, storage devices filter datasets using ML facets, and provide high-quality filtered datasets to ML applications. ML facets are properties of datasets or ML models that are used to optimize quality of the datasets consumed by the ML models. A storage device stores mappings between ML facets and metadata, such as dataset preparation metadata and dataset request metadata. The storage device automatically filters datasets stored in the storage device using ML facet mappings between the ML facets and the dataset preparation metadata, which indicate dataset preparation operations, such as removal, encryption, etc. When a dataset request is received from an ML application, the storage device transmits the filtered dataset, which contains lesser amount of raw data and is of higher quality, instead of an unfiltered version of the requested dataset, to the ML application. The storage device also allows an ML application user, such as a data scientist, to customize the dataset preparation. For instance, the storage device recommends ML facets to the requesting ML application using ML facet mappings between ML facets and dataset request metadata, which specifies details about the requesting ML application and the requested dataset. The user can select some or all of the recommended ML facets, which are used by the storage device to prepare customized version of the filtered dataset having relatively high quality. The storage device measures dataset quality by computing quality scores for datasets and associated filtered datasets. According to the quality scores, the storage device may filter the dataset iteratively to improve the quality of the filtered datasets.

The ML facets describe features or columns of a dataset, dataset contents, statistical nature of datasets, etc. Examples of ML facets describing relationship between dataset features include correlated features (redundant features having positive correlation) or non-correlated features (dataset features having no correlation), or the like. Likewise, example ML facets describing dataset contents include personal identifiable information (PII), public data, missing data, etc. Example ML facets describing the statistical nature of dataset include unbalanced data (data with a skewed distribution), mean, median, variance, or other statistical measures of data samples in the dataset. The ML facets may also describe ML model parameters, such bias, weights, hyperparameters, etc.

In some examples, the ML facet mappings are key value pairs. For example, the keys include ML facets and the values include dataset preparation metadata or tags. These tags indicate removal, encryption, sampling, normalization, or other dataset preparation processes. For example, in ML facet mappings, correlated features are paired with removal, PII is paired with encryption, unbalanced data is paired with sampling, and so on. In another example set of ML facet mappings, the keys include ML application type and dataset type, and the values include ML facets. Some examples of ML application type are classification, clustering, regression, etc., and that of dataset type are structured, unstructured datasets, etc. An example of such ML facets mappings includes pairing between classification application type, structured dataset type and correlated features.

The storage device identifies ML facets for each stored dataset using a set of predefined libraries. For example, the storage device identifies ML facets for a dataset capturing an organization's employee information. The dataset may include columns, such as name, phone number, experience, salary, performance rating, and performance metrics, and rows specifying values corresponding to each employee. By executing the libraries, the storage device identifies that performance rating and performance metrics are correlated features, name and phone number are PII, and salary is unbalanced data.

The storage device identifies dataset preparation tags paired with the identified ML facets as specified in the ML facet mappings. For example, the storage device identifies removal, encryption, and sampling as the dataset preparation tags paired with the identified ML facets (correlated features, private data, and unbalanced dataset) for the employee information dataset. The storage device executes the processes indicated in the dataset preparation tags on the dataset to generate a filtered dataset. For example, the storage device removes either performance rating or performance metrics (correlated features), encrypts name and phone number (PII), and samples salary information (unbalanced data) in the dataset. By removing one of the correlated features, encrypting personal data, and sampling salary in this manner, the employee information dataset is smaller, more secure, and has a balanced data distribution. As a result, the filtered dataset is of higher quality than the unfiltered dataset.

In some examples, the storage device generates filtered datasets customized by users, such as data scientists. For example, when a request for a dataset is received, the storage device recommends certain ML facets to the user instead of transmitting a filtered dataset. The recommendation assists the user to decide which ML facets and associated data preparation operations would enhance the quality of a filtered dataset and improve performance of the ML model. To provide such recommendations, the storage device relies on ML facet mapping between ML facets, requested dataset type, and requesting ML application type. On receiving dataset requests, the storage device determines the type of ML application requesting the dataset (e.g., using application identifier/tags) and the type of dataset requested. The storage device identifies the ML facets paired with the type of requesting ML application and type of requested dataset as indicated in the ML facet mappings. For example, if the requesting ML application type is classification and the requested dataset is structured dataset, then the storage device identifies correlated features and PII as corresponding ML facets in the ML facet mapping. The storage device recommends those ML facets to the ML application for selection.

The user of the ML application selects one or more of the recommended ML facets (e.g., via a user interface). For example, the user may select correlated features and not PII. The storage device receives the selected ML facet (correlated features) and identifies corresponding dataset preparation tags (removal of correlated features) as indicated in the ML facet mapping between ML facets and dataset preparation tags, and removes the correlated features from the dataset to generate a filtered dataset. In this manner, the storage device allows generation of the filtered dataset, which are customized using manual inputs. Such filtered datasets may be smaller in size and contain information relevant to the particular ML application. The storage device transfers such compact and high-quality datasets to ML applications without unduly consuming network bandwidth. The ML applications may efficiently train its ML models using such datasets.

The storage device quantifies the quality of datasets using quality scores. For example, the storage device computes quality scores for the filtered based on metrics, such as dataset size, storage performance (e.g., throughput), and/or ML application performance (accuracy, time taken to generate insights), etc., when the respective datasets are consumed. In some examples, the filtered and unfiltered datasets are fed to a test ML model such that the results of the test ML model are known in advance. The storage device determines ML application performance by comparing the results of the test ML model on the original and filtered dataset with the known results. Similarly, the storage device determines the storage performance during consumption of the original and filtered datasets.

In some examples, datasets are filtered iteratively until a desired level of quality is achieved. For example, a dataset is filtered and inputted to a test ML model such that the results generated by the test ML model are known in advance. Accordingly, the dataset is filtered iteratively and the quality score for each filtered version of the dataset is computed when consumed by the test ML model. This process may be performed until the quality score exceeds a certain threshold, for example. By filtering the datasets using the quality scores in this manner, the storage devices can reliably provide high-quality datasets.

Examples of this disclosure provide improvements by enhancing quality of datasets by removing noisy, redundant, and superfluous data from the datasets. As a result, examples also significantly reduce size of such datasets. The reduction in dataset size allows faster transmission of datasets from storage devices to ML applications and faster execution of ML applications at the computing device. The disclosed storage systems provide useful recommendations of ML facets and allow data scientists to leverage such recommendations to generate customized filtered datasets to suit requirements of ML models. The customized filtered datasets reduce dataset size and have high relevant information, and therefore, reduce training time, accuracy of results, etc., of particular ML models.

Examples also improve the storage device as relatively fewer number IO requests from ML applications need to be processed, thereby reducing latency and bandwidth consumption, and improving throughput. Additionally, the amount of computational and network resources (e.g., processing, memory, bandwidth, etc.) consumed at the storage device is significantly reduced. Examples also allow evaluating preparation of the datasets using the ML facets and the metrics disclosed herein. According to the evaluation, the ML facets for a dataset may be managed (e.g., encrypted, stored, or deleted).

Figure 1:
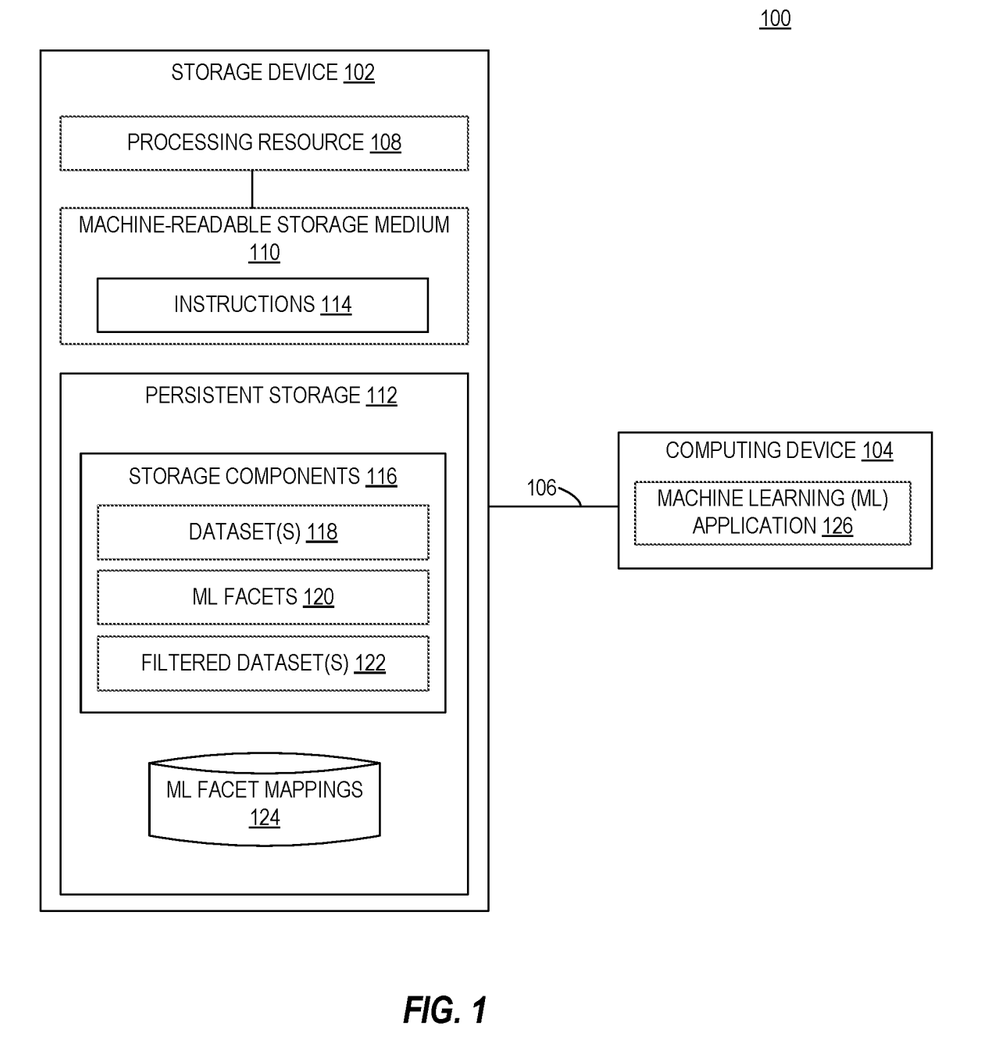
FIG. 1 is a block diagram depicting an example storage device that prepares filtered datasets for ML applications using ML facets.

FIG. 1 illustrates an example network 100 including a storage device 102 and a host computing device 104 (referred to herein as computing device 104). The storage device 102 and the computing device 104 are communicatively coupled to each other as depicted via a network link 106, which transfers a large amount of write data (data written to storage device 102) sent by applications and a large amount of read data (data retrieved from storage device 102). The storage device 102 includes a processing resource 108, a machine-readable storage medium 110, and persistent storage 112. The machine-readable storage medium 110 includes instructions 114 that are executable by the processing resource 108 to implement functionalities described herein in relation to 114.

The persistent storage 112 stores data received from other computing devices, such as the computing device 104, in a non-volatile manner. The persistent storage 112 may be implemented by any suitable type of storage components 116, such as non-volatile storage components (e.g., solid-state storage device(s) (SSDs), such as flash device(s), hard disk drive(s) (HDDs), or the like). The data (hereinafter referred to as datasets 118) includes data points or data samples and features or attributes associated with the data points. The persistent storage 112 also stores ML facets 120, which are properties of datasets or ML models that are used to optimize quality of the datasets consumed by the ML models. In examples described herein, the processing resource 108 executes one or more of the instructions 114 to generate filtered datasets 122 from the datasets 118 using associated ML facets 120 and ML facet mappings 124. The ML facet mappings 124 map ML facets and dataset preparation tags indicative of dataset preparation processes (as described later).

The computing device 104 executes host applications and retrieves the data from the storage device 102. In examples described herein, the computing device 104 executes a machine learning (ML) application 126, which sends input/output (IO) requests (e.g., read/write requests) to the storage device 102 for performing IO operations (e.g., read/write operations) on a volume. The ML application 126 may send read requests to read datasets for training an ML algorithm or for testing an ML model (e.g., in a production environment).

Even before the storage device 102 receives such read requests, the processing resource 108 executes the instructions 114 to identify ML facets 120 of each dataset 118 stored in the storage components 116. ML facets are dataset properties that describe features, contents, statistical nature of a dataset. Examples of ML facets describing features of a dataset include, but not limited to, correlated, non-correlated features, feature vector(s), anomaly points, missing values, null, or the like. Examples of ML facets describing statistical nature of a dataset include, but not limited to, balanced/unbalanced distribution, mean, variance, etc. In some examples, the properties include parameters of ML models, such as hyperparameters, bias, weights, etc., of an ML model. In some examples, the ML facet mappings 124 describe relationships between ML facets 120 and dataset preparation tags, which indicate certain dataset preparation steps. The dataset preparation tags are metadata describing type of dataset preparation operations. Example dataset preparation tags indicate removal, encryption, decryption, sampling, normalization, discretization, or the like. The ML facet mappings may be stored as key-value pairings, where the key may include an ML facet and the corresponding value may be dataset preparation tag(s). An example ML facet mapping is depicted in Table 1 below.

TABLE 1

Mapping between ML facets and dataset preparation tags

| ML Facets | Dataset preparation tags |
| --- | --- |
| Correlated features | Removing correlated features |
| Private data | Encryption |
| Unbalanced dataset | Sampling (oversampling or undersampling) |
| Missing value | Remove or fix missing values |

In some examples, the processing resource 108 identifies the ML facets of each dataset stored in the persistent storage 112 using analytics workflows. An analytics workflow is a set of executable libraries that identify ML facets in a given dataset. These libraries may also determine specific portions of the dataset (e.g., rows, columns, cells, etc.) related to the identified ML facets. A plurality of such analytics workflows may be stored in a workflow repository (not shown in FIG. 1). The processing resource 108 invokes an analytics workflow to determine whether a particular ML facet is present in a given dataset and identify specific portions associated with the ML facet. For example, the processing resource 108 may invoke a first and a second analytics workflows by inputting a dataset to both the workflows. The first analytics workflow identifies that the dataset includes correlated feature(s), and the second analytics workflow identifies that the dataset includes an unbalanced distribution. The workflows also identify dataset portions containing correlated feature(s) and unbalanced dataset. For example, the dataset portions containing the correlated feature(s) include two or more columns or features in the dataset, and the dataset portion containing the unbalanced dataset includes the entire dataset. The processing resource 108 stores the identified ML facets 120 in the storage components 116. In some examples, the processing resource 108 stores the ML facets 120 in a ML facets store (not shown in FIG. 1). The ML facets store may maintain a data structure (e.g., an index) storing identities of the datasets (or storage locations of the datasets) and the identified ML facets tagged to those identities.

The processing resource 108 executes the instructions 114 to generate a filtered dataset 122 from the dataset 118 using the identified ML facets and the ML facet mappings 124. For a given dataset, the processing resource 108 identifies dataset preparation tags paired with the identified ML facets of the dataset in the ML facets mappings 124. The processing resource 108 executes the dataset preparation steps indicated in those dataset preparation tags on the dataset 118. For example, if the identified ML facets of the dataset include correlated features and unbalanced dataset, the corresponding dataset preparation tags indicate removing correlated features and sampling the dataset (as indicated in Table 1). In some examples, the processing resource 108 executes the dataset preparation steps on the dataset portions outputted by the analytics workflow. For example, the processing resource 108 removes the correlated features in the two or more columns and samples the entire dataset to derive a filtered dataset. Removing correlated features leads to removal of superfluous content from the dataset and therefore reduces the size of the dataset. Sampling a dataset may include undersampling or oversampling that ensures a balanced distribution of the dataset is achieved. By generating filtered datasets in this manner, the storage device 102 removes raw information present in the datasets that may be more compact. Such datasets when consumed by ML models may yield relatively more accurate predictions. In examples where the dataset size is reduced due to such filtering, the ML model execution may be more efficient.

In some examples, the processing resource 108 determines quality scores for the dataset 118 and the filtered dataset 122. Quality score for a dataset is a measure of dataset quality, which indicates the amount of relevant information and the performance of the ML application and the storage device when the respective dataset is consumed. The quality score is computed using dataset metrics (e.g., dataset size), storage performance metrics (e.g., throughput, samples per IO operation) of the storage device 102, and application performance metrics (e.g., time-to-insights, accuracy, precision, recall, etc.). The processing resource 108 may compare the quality scores for the dataset 118 and for the filtered dataset 122, and accordingly provide or re-generate filtered datasets (as described in relation to FIG. 3).

The storage device 102 receives a request for the dataset from the ML application 126 executing on the computing device 104. The request may be initiated by a user (e.g., data steward, data scientist, data or storage administrator, etc.) overseeing ML model development on the computing device 104. In some examples, the user can view a list of volumes in the storage device 102 via a user interface (e.g., a graphical user interface (GUI) and initiate a read request targeting one or more volume(s) for retrieving specific dataset(s). The request is a read request indicating a volume identifier of the volume containing the dataset and a logical address of the dataset in the volume. The volume identifier refers to a volume name or number that identifies the volume. The logical address includes a logical block address or offsets, which indicate a location of the dataset in the volume.

The processing resource 108 executes the instructions 114 to transmit the filtered dataset 122 to the computing device 104 if the filtered dataset 122 has a higher quality score compared to that of original dataset 118. For example, the processing resource 108 sends the filtered dataset 122 to the computing device 104 over the network link 106. By transferring filtered datasets, which may be of relatively smaller compared to unfiltered datasets, the storage device 102 consumes significantly less bandwidth of the network link 106. Bandwidth indicates the maximum capacity of the link to transmit data over a network connection in a given amount of time. In some examples, the processing resource 108 stores the filtered dataset 122 in the storage components 116 and creates another volume that logically contains the filtered dataset 122. In such examples, the processing resource 108 may display the volume containing the filtered dataset to the computing device and receive read/write requests to be performed on the volume.

Figure 2:
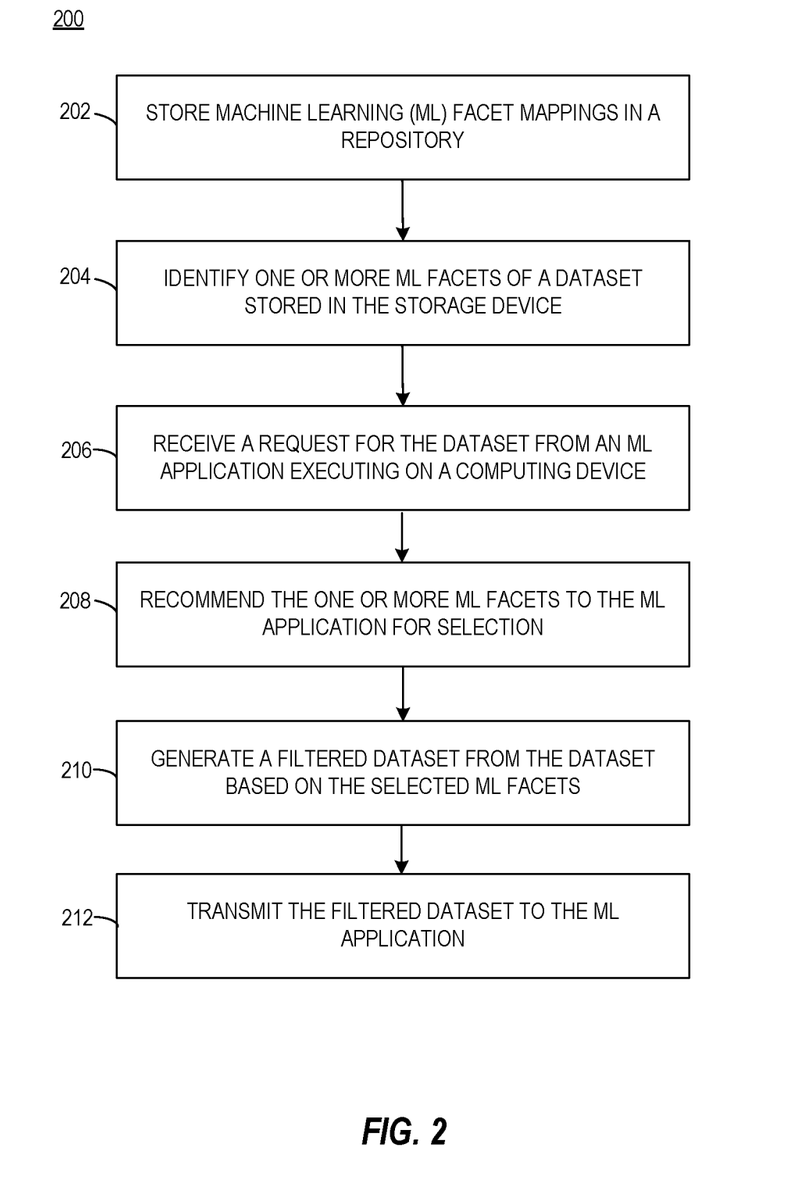
FIG. 2 is a flowchart of an example method to prepare filtered datasets for ML applications using ML facets.

FIG. 2 is a flowchart illustrating an example method for preparing filtered datasets for ML applications. In some examples, method 200 may be encoded as instructions in a computer-readable storage medium and executed on a computing device, such as the storage device 102 of FIG. 1.

At block 202, method 200 includes storing ML facet mappings in a repository. As described earlier, the ML facet mappings are mappings between ML facets and dataset preparation tags. In some examples, the ML facet mappings also include mappings between ML facets and ML application types and dataset types. Such ML facet mappings may also be key-value pairs, where the key may include ML application types and dataset types (e.g., in the form of a tuple) and the corresponding value may include ML facets. A dataset type indicates one or more categories of a requested dataset, and an ML application type indicates one or more categories of the ML application requesting the dataset. Examples of dataset types include, but not limited to, structured, unstructured, time-series, image datasets, or the like. Examples of ML application types include, but not limited to, classification, regression, forecasting, natural language processing applications, or the like.

At block 204, method 200 includes identifying ML facets of a dataset stored in a storage device. In some examples, identifying the ML facets includes inputting the dataset to a plurality of analytics workflows to identify the ML facets of the dataset as described in relation to FIG. 1. In other examples, identifying the ML facets includes retrieving predetermined ML facets of the dataset from a ML facets store, such as a feature store. The ML facets store may maintain dataset identities and associated ML facets, which are identified by the storage device using the analytics workflows.

At block 206, method 200 includes receiving a request for the dataset from an ML application executing on a computing device, such as the computing device 104. In some examples, the request is a read request indicating a volume identifier of the volume and a logical address of the dataset contained in the volume. The logical address may include a start offset, which indicates a starting location of the dataset in a logical address space of the volume. In some examples, the request also includes an application identifier or tag that indicates the ML application type sending the request. The identifier or tag specifies that the ML application is one of classification, regression, forecasting, natural language processing applications, or the application type. In some examples, the request indicates the dataset type of the requested dataset (i.e., structured, unstructured, time-series, image datasets, or the like).

At block 208, method 200 includes recommending the ML facets to the ML application for selection (e.g., via a user interface). In some examples, recommending ML facets includes identifying one or more ML facets based on the dataset type of requested dataset and the ML application type of the requesting ML application. In some examples, method 200 includes looking up the repository that stores ML facet mapping between ML facets and ML application types and dataset types in the storage device 102. As described earlier, the repository may include key-value pairs, where the keys may include application types and dataset types (e.g., (application type, dataset type) tuple) and the corresponding values may include ML facets. Table 2 below depicts a predefined mapping between the dataset type, ML application type, and ML facets.

TABLE 2

Repository table with ML facets, dataset types, and ML application types.

| Dataset type | ML application type | ML facets |
| --- | --- | --- |
| Structured | Classification | Correlated or non-correlated features |
| Time Series | Forecasting | Seasonality |
| Structured, unstructured | Classification, clustering | Unbalanced Dataset |
| Structured | Classification | Mean, Quadrant |
| Unstructured | Classification | Feature Vector |
| Structured, unstructured | All | Not null |
| Structured, unstructured | All | Private data |
| Structured, unstructured | Classification, Regression | Anomaly points |
| Structured, unstructured | All | Variance and distribution from variance |
| All | Classification, clustering | Missing values |
| All | Classification, Clustering, NLP | Data completeness |

On receiving a request for a dataset from the ML application, method 200 includes looking up the repository storing the ML facet mapping to identify ML facets using the application and dataset types. For example, if the application type of the requesting ML application is classification and the requested dataset type is a structured dataset, then the method 200 includes recommending correlated or non-correlated features to the ML application. Similarly, if the dataset type is structured or unstructured datasets and the application type is classification or clustering, then method 200 includes recommending an unbalanced dataset to the ML application. In some examples, recommending includes rendering the recommended ML facets via a GUI, which may be provided to the computing device executing the ML application. A user or admin can select one or more of the recommended ML facets via the user interface.

At block 210, method 200 includes generating a filtered dataset from the dataset according to the ML facets selected by the user. In some examples, method 200 includes preparing the filtered dataset based on the identified ML facets and the ML facet mapping between ML facets and dataset preparation tags (as discussed in relation to FIG. 1). For example, the user may select the recommended ML facets, which may include an unbalanced dataset and correlated features. The storage device receives those selected ML facets and looks up the repository storing mappings between ML facets and dataset preparation tags. Based on the look up, the storage device identifies dataset sampling and removing correlated features as the dataset preparation tags, which are paired with unbalanced dataset and correlated features. The method 200 generates a filtered dataset from the dataset by performing dataset preparation steps indicated in the identified dataset preparation tags associated with the selected ML facets. For example, the storage device performs dataset sampling (paired with unbalanced dataset) and removal of correlated features (paired with correlated features).

At block 212, method 200 includes transmitting the filtered dataset to the requesting ML application. For example, method 200 includes transmitting the filtered dataset to the computing device executing the ML application over the network link. In some examples, method 200 includes storing the filtered dataset in the storage components 116 and creating another volume that logically contains the filtered dataset. In such examples, method 200 includes displaying that volume containing the filtered dataset to the computing device and receiving read/write requests to be performed on that volume.

Figure 3:
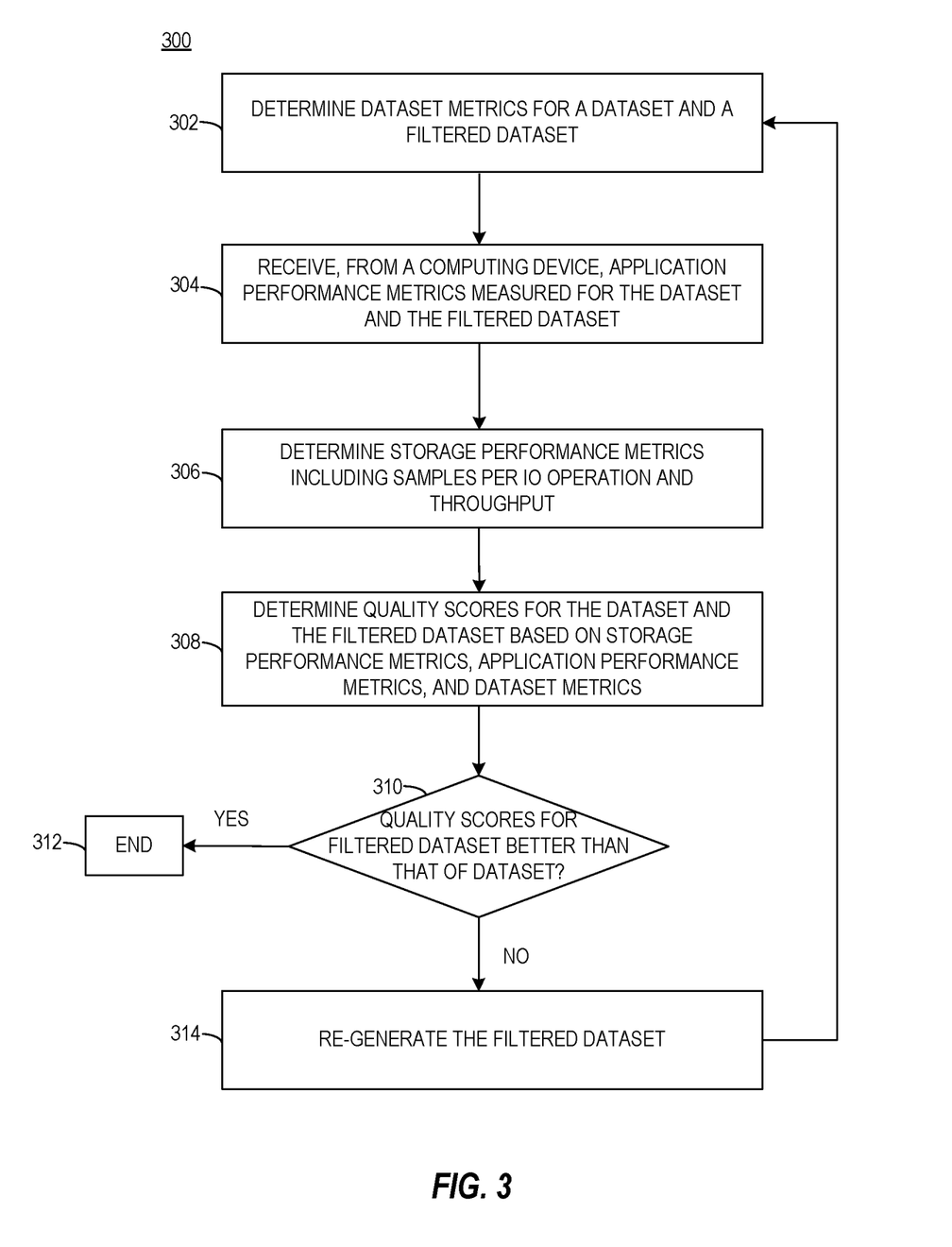
FIG. 3 is a flowchart of an example method to assess the quality of a dataset and associated filtered dataset.

FIG. 3 is a flowchart illustrating an example method to assess quality of a given dataset and associated filtered dataset(s).

At block 302, method 300 includes determining dataset metrics for a dataset and a corresponding filtered dataset. In examples described herein, a dataset metric includes dataset size. The dataset size may be a number of samples in a dataset (i.e., the number of records or rows in a dataset table). For example, the dataset size may be 1000000 samples. The dataset size may also refer to an amount of storage capacity consumed by the dataset. For example, the dataset size may be 30 gigabytes (GB). The method 300 determines the dataset size for each dataset stored in the storage device (e.g., as a background operation of the storage device). Likewise, the method 300 determines the dataset size of the filtered dataset after generating the filtered dataset and before creating a volume containing the filtered dataset.

At block 304, method 300 includes receiving application performance metrics from the computing device. Application performance metrics include the time taken to load a dataset by the ML application ($Load_{time}$), time taken to execute the ML application by the computing device ($Execution_{time}$), accuracy, precision, recall, etc., associated with an ML model developed using the ML application. The time taken to load a dataset by the ML application ($Load_{time}$) refers to the time spent by the ML application to retrieve the dataset from the storage device. For retrieving a given dataset from the storage device, the ML application may send a plurality of IO requests (read requests). The time taken to load the dataset ($Load_{time}$) is equivalent to the time taken to complete all the read requests.

The time taken to execute the ML application by the computing device ($Execution_{time}$) refers to the time spent processing the dataset by the ML application (e.g., during training or testing the ML model associated with the ML application). The application performance metrics also include time-to-insights, which refers to the time taken to obtain prediction results (e.g., classification, pattern recognition, anomaly detection, etc.) by the ML application or model. Time-to-insights may be the sum of the time taken to load the dataset by the ML application and the time taken to execute the ML application, and is given by equation (1).

$$\text{Time to insights} = Load_{time} + Execution_{time} \quad (1)$$

At block 306, method 300 includes determining storage performance metrics including samples per IO operation and throughput. Samples per IO operation refers to the dataset size (i.e., number of samples in a dataset or amount of storage capacity consumed by the dataset) processed in each IO operation for retrieving the dataset. Samples per IO operation is given by equation (2).

$$\text{Samples per } IO \text{ operation} = \frac{\text{Dataset size}}{IO \text{ operations performed for } dataset \text{ retrieval}} \quad (2)$$

For example, if the dataset size for a dataset is 1000000 samples (30 GB) and the number of IO operations performed to retrieve the dataset is 3750000, then the samples per IO operation is 1000000/3750000=0.26. Likewise, if the dataset size for a filtered dataset is 1000000 samples (20 GB) and the number of IO operations performed to retrieve the dataset is 2500000, then the samples per IO operation is 1000000/2500000=0.4.

Throughput refers to the dataset size (i.e., number of samples in a dataset or amount of storage capacity consumed by the dataset) processed in the time taken to obtain insights (i.e., time-to-insights).

$$Throughput = \frac{\text{Dataset size}}{Load_{time} + Execution_{time}} \quad (3)$$

For example, if the dataset size for a dataset is 1000000 samples (30 GB) and the time-to-insights is 60 seconds, then the throughput is 1000000/60=16,667 samples per second. Likewise, if the dataset size for a filtered dataset is 1000000 samples (20 GB) and the time-to-insights is 45 seconds, then the throughput is 1000000/45=22,222 samples per second.

TABLE 3

A comparison of the dataset metrics, application performance metrics, and storage performance metrics in the case of a given unfiltered dataset and associated filtered dataset.

| Metrics | Unfiltered dataset | Filtered dataset |
|---|---|---|
| Dataset size | 1000000 samples (30 GB) | 1000000 samples (20 GB) |
| Time-to-insights (equation 1) | 60 seconds | 45 seconds |

TABLE 3-continued

A comparison of the dataset metrics, application performance
metrics, and storage performance metrics in the case of a
given unfiltered dataset and associated filtered dataset.

| Metrics | Unfiltered dataset | Filtered dataset |
|---|---|---|
| Samples per IO operation (equation 2) | 1000000/3750000 = 0.26 unit | 1000000/2500000 = 0.4 unit |
| Throughput (equation 3) | 1000000/60 = 16,667 samples/second | 1000000/45 = 22,222 samples/second |

At block 308, method 300 determines respective quality scores for the dataset and the filtered dataset using the dataset metrics, storage performance metrics, and the application performance metrics. In some examples, method 300 includes assigning a score of '1' for desirable metric values and a score of '0' for undesirable metric values. For example, smaller dataset size, smaller time-to-insights, larger samples per IO operation, and larger throughput are considered desirable metrics. Therefore, '1' may be assigned for the dataset size, time-to-insights, samples per IO operation, and throughput. On the other hand, larger dataset size, larger time-to-insights, smaller samples per IO operation, and smaller throughput are undesirable metrics, and therefore, '0' may be assigned for dataset size, time-to-insights, samples per IO operation, and throughput.

In the example of Table 3, when compared with unfiltered dataset, the filtered dataset has smaller dataset size, smaller time-to-insights, larger samples per IO operation, and larger throughput. Method 300 may assign '1' each for dataset size, time-to-insights, samples per IO operation, and throughput of the filtered dataset. Similarly, unfiltered dataset has larger dataset size, larger time-to-insights, smaller samples per IO operation, and smaller throughput. Method 300 may assign '0' each for dataset size, time-to-insights, samples per IO operation, and throughput of the unfiltered dataset. In some examples, method 300 may determine quality score as an aggregate of the score for each metric for the unfiltered dataset and filtered dataset. For the filtered dataset, the quality metric is 1+1+1+1=4, while for the unfiltered dataset, the quality metric is 0+0+0+0=0. In other examples, the quality score may be computed using alternate methods, such as average, weighted average, or other statistical measures. In such examples, only some of the dataset metrics, application performance metrics, storage performance metrics may be considered for the computation.

At block 310, method 300 compares the quality scores for both the dataset and the filtered dataset. If the quality scores for the filtered dataset are better, i.e., larger (labeled as "YES" at block 310), method 300 proceeds to block 312. At 312, method 300 ends, i.e., no further action is performed on the filtered dataset. However, if the quality score for the filtered dataset is not better, i.e., smaller, than that of the dataset (labeled as "NO" at block 310), method 300 proceeds to block 314. At block 314, method 300 includes regenerating the filtered dataset. For example, method 300 includes performing additional data preparation steps to create a new filtered dataset. In some examples, if the quality score does not improve despite the additional data preparation steps, method includes providing the original dataset to the ML application.

In some examples, method 300 loops back from block 314 to block 302 to determine metrics for the new filtered dataset in the next iteration. Blocks 302-310 are performed to determine quality scores for new filtered datasets and compared to the original unfiltered dataset. By assessing the quality of filtered datasets in this manner, examples described herein iteratively generate filtered datasets that have less noise, redundancy, or superfluous data.

Figure 4:
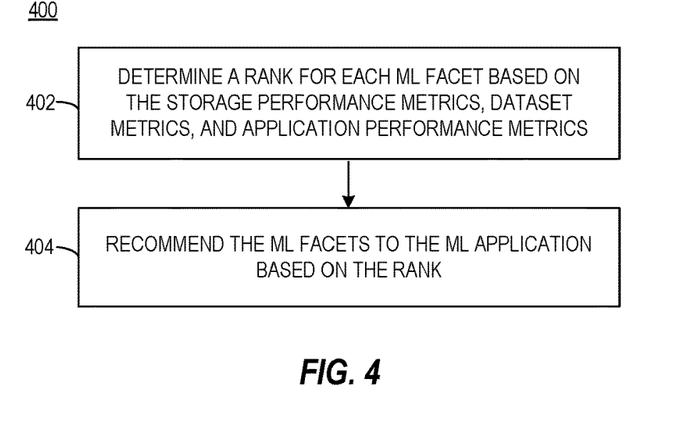
FIG. 4 is an example method to recommend the ML facets.

FIG. 4 is a flowchart illustrating an example method to recommend ML facets.

At block 402, method 400 includes determining a rank for each ML facet based on one or more of dataset metrics, application performance metrics, and storage performance metrics. The rankings indicate how much an ML facet and its associated dataset preparation tag improves the quality of a given dataset in comparison to other ML facets. Table 4 illustrates an example list of ML facets and associated dataset preparation tags for a dataset. As shown, the ML facets of the dataset include correlated features, unbalanced dataset, and missing values. The data preparation tags associated with correlated features, unbalanced dataset, and missing values, include removing one or more features, dataset sampling (e.g., undersampling or oversampling), and fixing the data samples and/or features.

TABLE 4

ML facets and associated data preparation tags

| ML facet | Dataset preparation tag |
|---|---|
| Correlated features | Removing feature(s) |
| Unbalanced dataset | Dataset sampling (undersampling or oversampling) |
| Missing values | Fixing missing data samples |

To determine the rank for each ML facet of a dataset, method includes determining the quality score of the filtered dataset generated by exclusively performing the associated data preparation step on the dataset. In the above example, three different filtered datasets are generated by removing correlated features, sampling the dataset, and fixing missing data samples, independently on the original dataset. For example, a first filtered dataset is generated by removing one or more correlated features in the dataset, a second filtered dataset is generated by sampling, and a third filtered dataset is generated by fixing missing data samples. The quality scores for the first, second, and third filtered datasets are determined based on the dataset metrics, storage performance metrics, and application performance metrics.

For each filtered dataset, method includes determining the dataset metrics, application performance metrics of the ML application, and storage performance metrics. The dataset metrics include at least a dataset size (number of samples or amount of storage capacity consumed) of each filtered dataset. The application performance and storage performance metrics are determined using a read request from a test ML application to retrieve data and execute a test ML model. The test ML application and ML model may be example application and model, which are executing on another computing device, and whose results are known in advance. For example, the storage device transmits the first, second, and third filtered datasets in response to the read requests from the test ML application. The storage device determines the storage performance metrics including samples per IO operation, throughput, etc. The application performance metrics is determined based on the execution of the test ML model. The storage device receives application performance metrics including time-to-insights, accuracy, precision, recall, etc., from the test ML application based on the execution of the test ML model.

Further, method 400 includes comparing the quality scores for each of the first, second, and third datasets.

Method 400 identifies the filtered dataset with the best metrics based on the comparison. Method 400 includes ranking the ML facets according to the quality scores. For example, if the first filtered dataset is associated with the highest quality scores, then method 400 assigns the highest rank to correlated features. Similarly, if the third filtered dataset is associated with the least quality score, then method 400 assigns the lowest rank to missing values.

At block 404, method 400 includes recommending the ML facets (e.g., correlated features) to the computing device based on the rank. For example, the method 400 includes recommending correlated features to ML application for selection. In some examples, the method 400 also looks up the repository storing the ML facet mappings of the ML facets and ML application types, and dataset types, in addition to the ranks of the ML facets, to provide a recommendation to the ML application.

Figure 5A:
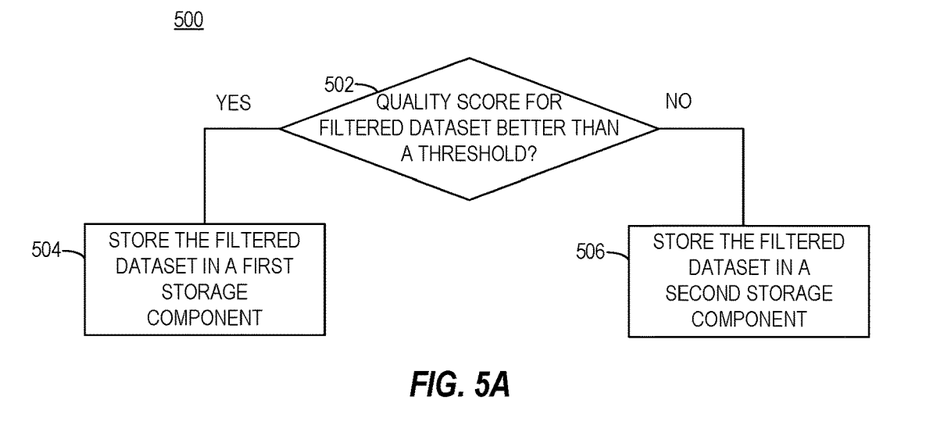
FIGS. 5A and 5B are example methods to apply dataset management policy based on the ML facets.
Figure 5B:
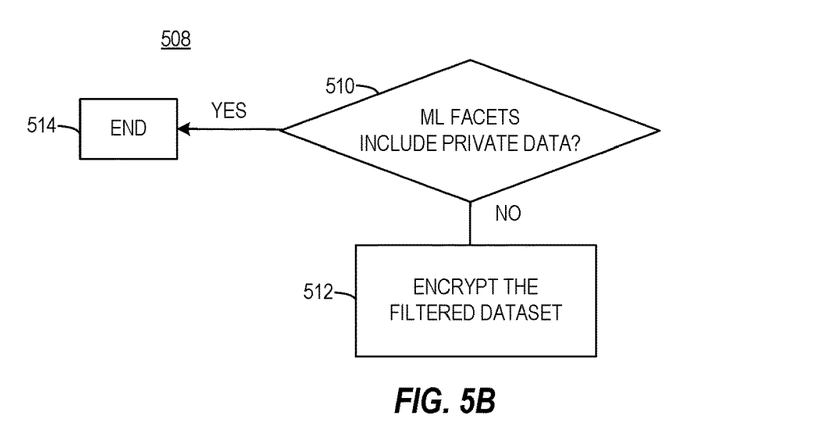

FIGS. 5A and 5B are flowcharts illustrating example methods to apply dataset management policies based on quality or ML facets of datasets. The dataset management policies are certain rules that govern storage (e.g., tiering, backup, replication, etc.) of datasets. A user (e.g., a storage administrator) can create such policies to improve storage management. The quality of a dataset may be quantified using the quality scores (storage, application performance metrics, or dataset metrics) and the ML facets include characteristics describing types of contents of the dataset (e.g., private data). In examples described herein, such policies are triggered when certain conditions associated with a filtered dataset are satisfied. Block 502 in FIG. 5A and block 510 in FIG. 5B are examples of the conditions and the blocks 504, 506, and 512 are examples of associated dataset management actions.

FIG. 5A is a flowchart of a method to apply dataset management policies based on the quality of the datasets. At block 502, method 500 includes determining whether quality scores for a given dataset is better than respective threshold. For example, method 500 compares the quality score with a threshold quality score. If the quality score is greater than the threshold quality score (labeled as "YES" at block 502), then method 500 proceeds to block 504. Otherwise, the method proceeds to block 506.

At block 504, method 500 includes storing the filtered dataset in a first storage component, which allows relatively faster read operations. For example, high-quality filtered datasets (dataset with quality score greater than the threshold) may be stored in flash-based storage components (e.g., SSD(s), cache memory, etc.). By storing high-quality datasets in relatively fast storage components in this manner, datasets that have a lesser amount of noise, redundancy, and/or superfluous data are easier to access compared to unfiltered datasets.

If the quality score is less than the threshold quality score (labeled as "NO" at block 502), then method 500 proceeds to block 506. At block 506, method 500 includes storing the filtered dataset in a second storage component, which does not allow relatively fast read operations. For example, low-quality filtered datasets (datasets with quality score less than the threshold) may be stored in spinning-based storage components (e.g., HDD(s), etc.). By storing low-quality datasets in relatively slow storage components in this manner, datasets that have a higher amount of noise, redundancy, and/or superfluous data do not consume the storage capacity of faster storage components (e.g., SSD(s), cache memory), which may be used for storing high-quality datasets.

FIG. 5B is a flowchart of a method 508 to apply dataset management policies based ML facets of the datasets. At block 510, method 508 includes determining whether the ML facets of the dataset include private data (e.g., personally identifiable information) or other data that should be anonymized before transmitting in response to read requests. Examples of private data include, but not limited to, full name, passwords, credentials, bank details, user images, email addresses, or the like.

If the ML facets include private data (labeled as "YES" at block 510), method 508 proceeds to block 512. At 512, method 508 anonymizes (e.g., encrypts) the private data. If the ML facets do not include private data (labeled as "NO" at block 510), method 508 proceeds to block 514. At 514, method 508 does not take any action (i.e., encrypts) on the datapoints or the entire dataset. In this manner, datasets that contain private data can be encrypted before transmission in response to read requests.

Figure 6:
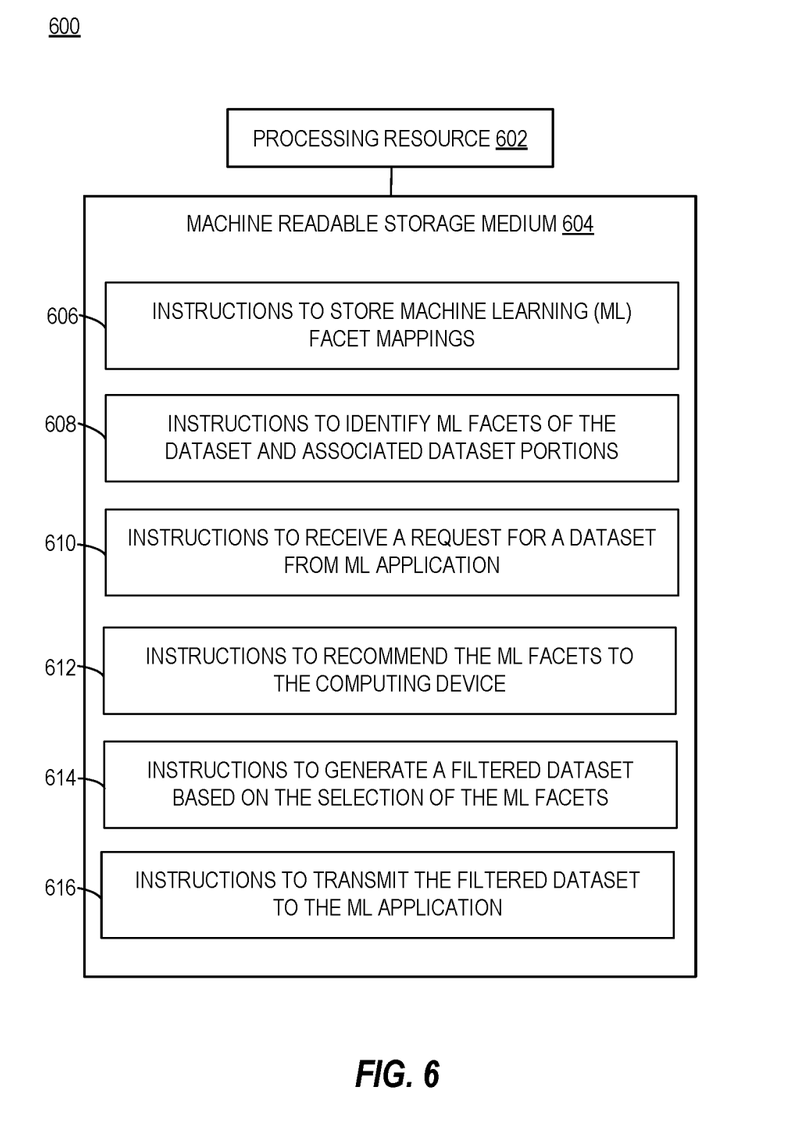
FIG. 6 is a block diagram depicting a processing resource and a machine-readable medium encoded with example instructions to prepare filtered datasets for ML applications using ML facets.

FIG. 6 is a block diagram illustrating a processing resource 602 and a machine-readable storage medium 604 encoded with example instructions to prepare filtered datasets for ML applications using ML facets. The preparation of the dataset is performed dynamically, i.e., when a request for the dataset is received.

The instructions 606, when executed, cause the processing resource 602 to store ML facet mappings, which include mappings between ML facets and dataset preparation tags. In some examples, the mappings include mappings between ML facets, ML application types, and dataset types. The instructions 608, when executed, cause the processing resource to identify ML facets of the dataset and associated dataset portions. In some examples, the instructions 608 includes determining whether the ML facets associated with the dataset are available (e.g., in a repository). The instructions 608 may also invoke analytics workflow to identify the ML facets (as described earlier).

The instructions 610, when executed, cause the processing resource 602 to receive a request for a dataset from an ML application executing on a computing device. The instructions 612, when executed, cause the processing resource 602 to recommend the ML facets to the computing device for selection. In some examples, recommending the ML facets includes identifying ML facets related to a type of the dataset and/or type of the requesting ML application and providing those ML facets as a recommendation to the computing device. Alternatively, the ML facets may be recommended based on a rank of the ML facets associated with the dataset. A user may select one or more of the recommended ML facets and send it to the processing resource 602.

The instructions 614, when executed, cause the processing resource 602 to generate a filtered dataset based on the selection of the ML facets. The instructions 614 includes executing data preparation operations indicated in the dataset preparation tags associated with the selected ML facets. The instructions 616, when executed, cause the processing resource to transmit the filtered dataset to the ML application. In some examples, the instructions 614 includes creating a volume containing the filtered dataset and redirecting the request to the volume. In some examples, subsequent requests for the dataset are redirected to the volume containing the filtered dataset.

In examples described herein, the term "machine learning application" or "ML application" refers to one or more methods, algorithms, statistical models, mathematical models, or computer programs trained to identify patterns and correlations, and predict results through inferences and probability, for a given input. The ML applications may be or may include a set of machine-executable instructions capable of performing predictions, classifications, clustering, natural language processing, or the like. The ML applications may be one of a container, a pod, a virtual machine, or a containerized application.

A dataset refers to a collection of data records (i.e., samples, observations, or datapoints) and features or attributes associated with the data records. In examples described herein, a dataset type is broadly categorized into a structured dataset and an unstructured dataset. A structured dataset conforms to a tabular format with rows and columns. For example, the rows may represent data records and the columns may represent various features associated with each data record. An unstructured dataset is not organized in a predefined manner. Unstructured datasets may include images, videos, or other media. Other specific dataset types may include numerical data (e.g., continuous or discrete), time-series data (i.e., sequence of numbers collected at regular intervals with timestamps), categorical data (e.g., class labels), text data, or the like. ML facets are properties of datasets or ML models that are used to optimize quality of the datasets consumed by the ML models. The properties are mapped to dataset preparation tags as set of ML facet mappings that indicate the type of data preparation operations to be performed on the dataset. Alternatively, the properties are mapped to ML application type and dataset type as another set of ML facet mappings.

A filtered dataset refers to a dataset obtained by performing data preparation steps on a raw data (i.e., a given dataset). The filtered dataset includes data records and associated features that do not degrade application performance metrics, such as accuracy, precision, recall, etc., and reduce the time taken to execute the ML application consuming the filtered dataset.

Analytics workflow refers to a set of libraries that identify ML facets in a given dataset. In some examples, the analytics workflow may include ETL operations. The analytics workflow may also include analytics models to mine, filter, organize, and exploit the raw data, which is typically stored in the storage devices.

A volume may be a collection of volumes of data (e.g., "virtual volumes", Logical Unit Numbers ("LUNs"), or the like). Each volume includes a virtual address space backed by physical storage components in the persistent storage, such that, when data is written to the volume, the data may be stored in the storage components (e.g., when flushed from cache, etc.).

In some examples, a request for the dataset is a read request, which specifies a volume identifier of a volume and a logical address in the volume. For example, the read request may specify a volume name as the volume identifier of the volume, and some offset length to read a dataset contained in the volume. The offset length may correspond to the size of the dataset to be read from a volume. In some examples, a storage device includes a mapping index, which may be a data structure that maps logical addresses in a volume to physical storage locations in the storage device. The storage device determines the physical storage location of the requested dataset using the mapping index and fetches the dataset.

The term "associated with" may refer to comprises in, included in, connected to, or related to.

In the examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In the examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a storage device, a hyperconverged device, a server, a storage component, a desktop or laptop computer, or any other processing device or equipment including a processing resource. In certain examples, the computing device may be or may include a virtualized computing device (e.g., a virtual machine or a containerized application) executing on hardware. In the examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In the examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIG. 1, storage medium 110 may be implemented by one machine-readable storage medium, or multiple machine-readable storage media. Moreover, in certain examples, where the computing device may be a virtual machine or a containerized application, the processing resource and the machine-readable storage medium may represent a processing resource and a machine-readable storage medium of the hardware or a computing system that hosts the computing device as the virtual machine or the containerized application.

In some examples, the functionalities described above in relation to instructions described herein may be implemented by one or more engines which may be any combination of hardware and programming to implement the functionalities of the engine(s). In the examples described herein, such combinations of hardware and programming may be implemented in a number of different ways. For example, the programming for the engines may be processor-executable instructions stored on at least one non-transitory machine-readable storage medium, and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

In examples described herein, the storage device is implemented as a computing device with data storage capabilities (e.g., a storage array, a backup appliance, a hyperconverged system, or the like) or a network of such computing devices. The storage device includes a controller comprising processing resources and machine-readable storage medium that may have a physical connection with persistent storage. The storage device also includes a network interface, which may be any suitable hardware device for communicating on the network. Examples of the network interface may be respective network interface cards (NICs), FC host-bus adapters (HBAs), or the like. Examples of the network may include a storage area network (SAN), a network-attached storage (NAS), a direct-attached storage (DAS), a local area network (LAN), a virtual LAN (VLAN), a wireless local area network (WLAN), a virtual private network (VPN), the Internet, or the like, or a combination thereof.

Although the present disclosure has been described in detail, it should be understood that various changes, substitutions, and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

What is claimed is:

1. A storage device comprising:
    a processing resource; and
    a non-transitory machine-readable storage medium comprising instructions executable by the processing resource to:
        store machine learning (ML) facet mappings between ML facets and dataset preparation tags in a repository, wherein the ML facets are properties of datasets or ML models for optimizing quality of the datasets;
        identify a ML facet of a dataset stored in the storage device;
        determine, based on at least one of dataset metrics of the dataset, storage performance metrics of the storage device, and application performance metrics, a first quality score for the dataset, wherein the first quality score indicates an amount of relevant information in the dataset;
        identify a dataset preparation tag mapped to the identified ML facet as indicated in the ML facet mappings;
        generate a filtered dataset from the dataset based on the dataset preparation tag and determine, based on at least one of dataset metrics of the filtered dataset, the storage performance metrics of the storage device, and the application performance metrics, a second quality score that indicates an amount of relevant information in the filtered dataset; and
        in response to a request for the dataset from an ML application and determining that the second quality score is greater than the first quality score, transmit the filtered dataset to the ML application across a bandwidth-limited communication link.

2. The storage device of claim 1, wherein to identify the ML facet, the processing resource executes one or more of the instructions to: input the dataset to analytics workflow, wherein the analytics workflow determines the ML facet of the dataset and a dataset portion associated with the ML facet.

3. The storage device of claim 2, wherein to generate the filtered dataset, the processing resource executes one or more of the instructions to:
    Identify a dataset preparation operation indicated in the dataset preparation tag; and
    prepare the dataset based on the dataset preparation operation and the dataset portion.

4. The storage device of claim 1, further comprising:
    an ML facets store to store ML facets of each dataset in the storage device and an identifier of the respective dataset.

5. The storage device of claim 1, wherein the processing resource executes one or more of the instructions to: store an ML facet mapping between ML facets, application type, and dataset type.

6. The storage device of claim 5, wherein the processing resource executes one or more of the instructions to: in response to receiving the request for the dataset, recommend one or more of the ML facets to the ML application for selection based on the mapping between the ML facets, the application type, and the dataset type.

7. The storage device of claim 6, wherein to recommend the ML facets, the processing resource executes one or more of the instructions to:
    identify one or more of the ML facets based on the dataset type of the dataset and the application type of the ML application; and
    transmit one or more the ML facets to the ML application as a recommendation.

8. The storage device of claim 7, further comprising a user interface to: present one or more of the ML facets to the ML application for selection.

9. The storage device of claim 1, wherein the processing resource executes one or more of the instructions to:
    receive, from a test application, the application performance metrics, wherein the application performance metrics include one or more of time-to-insights, accuracy, precision, or recall; and
    determine the storage performance metrics, the dataset metrics of the dataset, and the dataset metrics of the filtered dataset, wherein:
        the storage performance metrics include one or more of samples per IO operation or throughput; and
        the dataset metrics of the dataset and the dataset metrics of the filtered dataset include at least a dataset size.

10. The storage device of claim 9, wherein the processing resource executes one or more of the instructions to:
    determine a rank for each of the ML facets based on the storage performance metrics, the dataset metrics, and the application performance metrics; and recommend the ML facets to the ML application based on the rank.

11. The storage device of claim 1, wherein the processing resource executes one or more of the instructions to:
store the filtered dataset in persistent storage of the storage device;
create a volume containing the filtered dataset; and
display the volume to the ML application.

12. The storage device of claim 1, wherein the ML facets include one or more of correlated features, non-correlated features, hyperparameters, bias, seasonality, balanced dataset, mean, quadrant, private data, variance, missing values, data completeness, anomalous dataset, quantization, high frequency filtering, and null datasets.

13. A method comprising:
storing, by a storage device, machine learning (ML) facet mappings between ML facets and dataset preparation tags in a repository, wherein the ML facets are properties of datasets or ML models for optimizing quality of the datasets;
identifying, by the storage device, one or more ML facets of a dataset stored in the storage device;
determining, based on at least one of dataset metrics of the dataset, storage performance metrics of the storage device, and application performance metrics, a first quality score for the dataset, wherein the first quality score indicates an amount of relevant information in the dataset;
receiving, by the storage device, a request for the dataset from an ML application executing on a computing device;
recommending, by the storage device, the one or more ML facets to the ML application for selection;
generating, by the storage device, a filtered dataset from the dataset based on dataset preparation tags mapped to the selected ML facets and determining, based on at least one of dataset metrics of the filtered dataset, the storage performance metrics of the storage device, and the application performance metrics, a second quality score that indicates an amount of relevant information in the filtered dataset; and
in response to determining that the second quality score is greater than the first quality score, transmitting, by the storage device, the filtered dataset to the ML application across a bandwidth-limited communication link.

14. The method of claim 13, further comprising:
in response to generating the filtered dataset, applying, by the storage device, a dataset management policy for the filtered dataset based on the ML facets, wherein the dataset management policy includes rules to perform one or more of data protection, data backup, or data tiering.

15. The method of claim 14, wherein:
the application performance metrics include one or more of time-to-insights, accuracy, precision, or recall;
the storage performance metrics include one or more of samples per IO operation and throughput; and
the dataset metrics of the dataset and the dataset metrics of the filtered dataset include at least a dataset size.

16. The method of claim 15, further comprising:
based on the quality scores, storing the filtered dataset in a first storage component and the dataset in a second storage component, wherein the first storage component allows faster data retrieval.

17. The method of claim 14, further comprising:
in response to determining that the ML facets include sensitive data, apply the dataset management policy to encrypt the filtered dataset.

18. The method of claim 14, further comprising:
generating a new filtered dataset based on the one or more dataset preparation tags until the second quality score is greater than a threshold.

19. A non-transitory machine-readable storage medium comprising instructions that, when executed, cause a processing resource of a storage device to:
store machine learning (ML) facet mapping between ML facets and dataset preparation tags in a repository, wherein the ML facets are properties of datasets or ML models for optimizing quality of the datasets;
identify, for the datasets, ML facets and associated dataset portions using analytics workflows;
determine, based on at least one of dataset metrics of the dataset, storage performance metrics of the storage device, and application performance metrics, a first quality score for a dataset, wherein the first quality score indicates an amount of relevant information in the dataset;
receive a request for the dataset from an ML application executing on a computing device;
recommend the ML facets to the ML application for selection;
generate a filtered dataset from the dataset based on one or more dataset preparation tags mapped to the selected ML facets and determine, based on at least one of dataset metrics of the filtered dataset, the storage performance metrics of the storage device, and the application performance metrics, a second quality score that indicates an amount of relevant data in the filtered dataset; and
in response to determining that the second quality score is greater than the first quality score, transmit the filtered dataset to the ML application across a bandwidth-limited communication link.

* * * * *